United States Patent Office 3,363,046
Patented Jan. 9, 1968

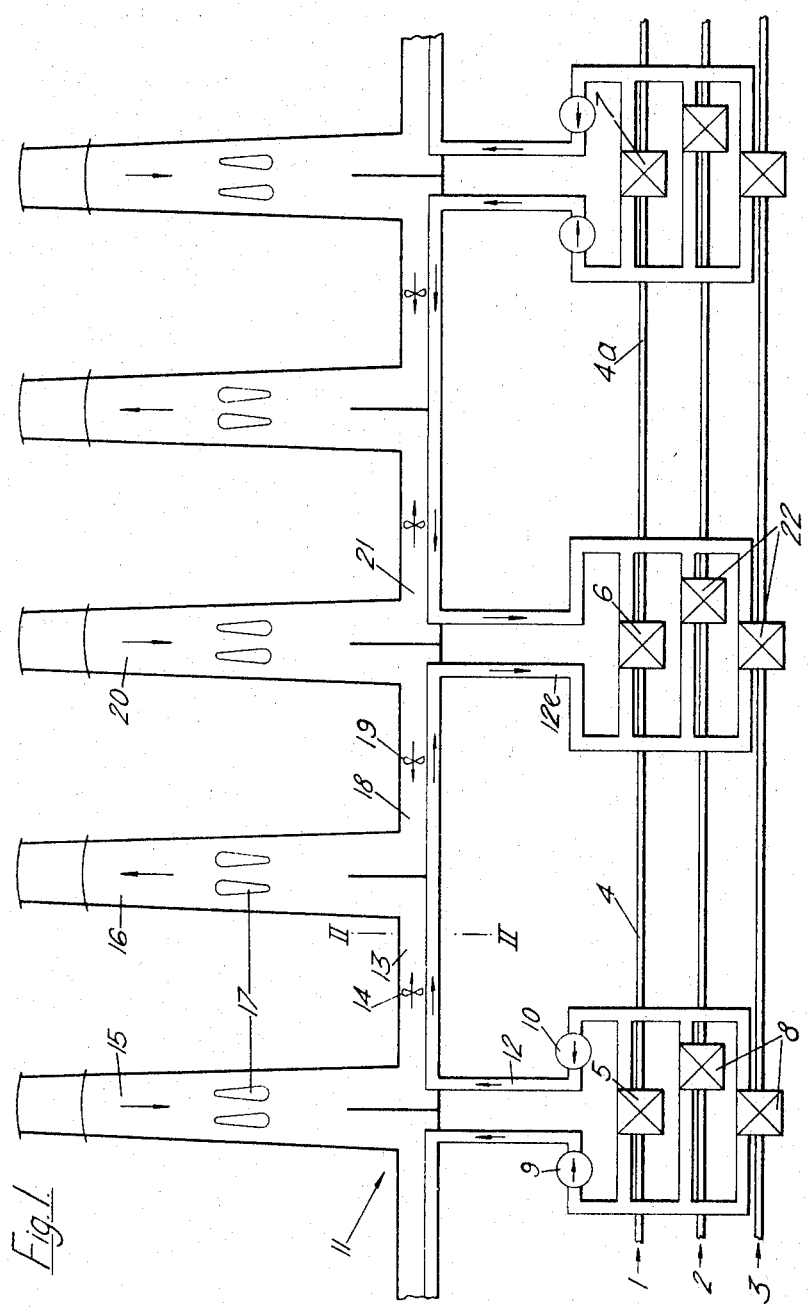

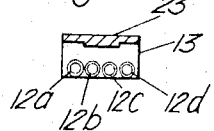
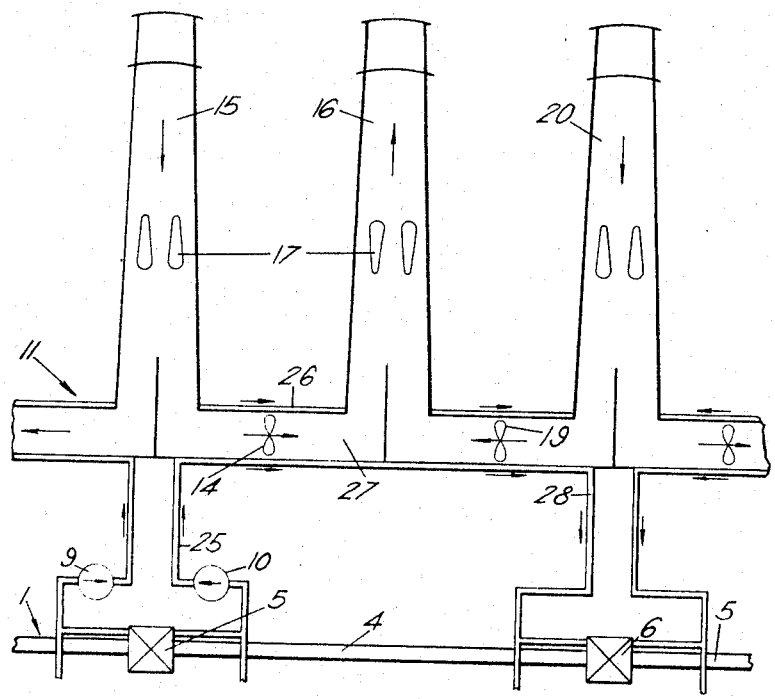

3,363,046
ELECTRIC CABLE INSTALLATIONS
John Derrick Endacott, Sidkup, Kent, England, assignor to British Insulated Callender's Cables, London, England
Filed Sept. 14, 1965, Ser. No. 487,126
Claims priority, application Great Britain, Sept. 24, 1964, 39,000/64
13 Claims. (Cl. 174—15)

ABSTRACT OF THE DISCLOSURE

An installation for cooling electric cables by circulation of a primary cooling fluid in a closed circuit through or adjacent to the section of cable to be cooled. The closed circuit includes a return pipe along the cable route which forms the primary circuit of an elongated heat exchanger which extends substantially the length of the return contiguous with the cable and is in heat exchange relationship with a duct or ducts carrying a circulating secondary cooling fluid.

---

This invention relates to electric cable installations in which a cable is cooled by the circulation of a cooling fluid from one end of a length of the cable to the other (which length may be a complete route length or merely a part thereof comprising one or more jointed cable lengths), through the cable or through a conduit associated therewith and back through a return pipe laid along substantially the same route as the length of cooled cable, and through at least one heat exchanger for extracting heat from the fluid. The invention is especially but not exclusively concerned with oil-filled power cable installations in which the cooling fluid is the insulating oil with which the dielectric is impregnated and in which a duct for circulation of the oil is provided through the or each conductor of the cable.

In accordance with the present invention, in an installation of this kind, the heat exchanger or exchangers for a cooled length of cable are associated with and extend along a major part of that length, a major part of the return pipe forming a part of the heat exchanger or exchangers.

The primary cooling fluid circulated through the cable or a conduit associated therewith need not be an insulating fluid and need not be in direct contact with the cable dielectric. It may for example be circulated through a conduit helically applied around a cable, or in a three phase installation in which the cables are arranged in trefoil, it may be a conduit located in the central space between the three cables. In a pipe line cable system, the primary cooling fluid may circulate through the pipe line in which the cable or cables are located.

As already indicated, we prefer however to circulate the primary fluid through the cable conductor or conductors, since this is where the heat is generated, and to use a fluid that serves the dual purpose of impregnating the cable dielectric and cooling the cable.

Any form of heat exchanger, single or multi-stage, for positively extracting heat from the fluid passing through the return pipe can be used provided that the exchanger or exchangers or at least the first stage of a multi-stage exchanger or exchangers extend along a major part of the cooled length of cable. Where a multi-stage heat exchanger or exchangers is or are used, the final stage need not be distributed along the return pipe, for example a circulating secondary cooling fluid used for extracting heat from the primary cooling fluid in the return pipe may pass through a second stage heat exchanger not associated with the pipe.

In a cable installation comprising a number of cables laid alongside each other, as an alternative to providing each cable with a separate return pipe, a single return pipe with associated heat exchanger or exchangers may serve two or more cooled lengths of cable lying alongside each other, the capacity of the heat exchanger or exchangers being suitably increased to absorb the heat generated in all of the cables connected to the single pipe. Whether the installation comprises a single cable or a number of cables laid alongside each other, each cooled length of cable may, if desired, be served by more than one return pipe. Where there are several return pipes, each pipe may be provided individually with its heat exchanger or exchangers or all of the pipes or separate groups of the pipes may be associated with the same heat exchanger or exchangers.

Where a single return pipe is replaced by a number of pipes connected in parallel as a convenient method of increasing the surface area in contact with the secondary fluid and all of the pipes form part of the same heat exchanger or exchangers such a group of pipes will hereinafter be referred to as "the return pipe."

The return pipe will normally be substantially straight except where it passes around curves in the cable route but it may, if necessary to increase their efficiency, adopt a devious path in the heat exchanger or exchangers. Also, to increase its heat transfer performance, the cross-section and/or longitudinal section of the return pipe may be suitably varied to increase its surface area, e.g. it may be corrugated or finned.

In my preferred form of heat exchanger, a major part of the return pipe passes through or around a duct through which air is passed and then vented to the atmosphere in such a way as to extract sufficient heat from the oil passing through the return pipe to maintain the cable at a desired temperature. The air duct may be separated into a number of shorter lengths through each of which, separately, air is passed and vented to the atmosphere, provided that the ducts together extend over a major part of the cooled length of the cable.

Two cable installations in accordance with the invention will hereinafter be described by way of example with reference to the accompanying drawings in which:

FIGURE 1 is a diagrammatic representation of part of one of the installations,

FIGURE 2 is a cross-section of an air duct used in the first installation, and

FIGURE 3 is a diagrammatic representation of part of the second installation.

Referring to FIGURES 1 and 2, the installation comprises three 400 kv. single core oil filled cables 1, 2 and 3 each having a hollow stranded conductor with a 2″ (50.8 mm.) oil duct. Referring to the cable 1, a first cooled length 4 which is 900′ (275 metres) long extends between a stop joint 5 and a high pressure joint 6 and a second 900′ (275 metres) length 4a of the cable extends between the high pressure joint 6 and another stop joint 7. The high pressure joint is not a stop joint but a joint in which there is a high resistance to flow of the impregnating oil from the conductor of one cable length (4) to the conductor of the other cable length (4a).

The two oil inlets of the stop joint 5 which communicate respectively with the oil ducts of the cable conductors connected at the joint and similar inlets of the stop joints 8 are all connected in parallel as shown to the inlet side of a pair of oil pumps 9 and 10. The pumps extract oil simultaneously from both lengths of cable connected together at the stop joints 5 and 8 and circulate it through a heat exchanger generally indicated as 11.

The pump 10 delivers the oil extracted from the cable length 4 of the cable 1 and the equivalent cable lengths of the cables 2 and 3 into four corrugated aluminum pipes of 4″ (100 mm.) outside diameter which together form the "return pipe." These pipes are collectively represented at 12 in FIGURE 1 but are shown individually as 12a, 12b, 12c and 12d in FIGURE 2. From FIGURE 2 it will be seen that they lie side by side in a part 13 of an air duct, that extends along the whole of the cable route, as can be seen in FIGURE 1.

The part 13 of the air duct incorporates an air blower 14 by which air is drawn into the duct from the atmosphere through an inlet vent 15 and is expelled into the atmosphere through a second vent 16, both vents being provided with attenuators 17. From the part 13 of the air duct (FIGURE 1) the four pipes 12 pass into a part 18 of the air duct (FIGURE 1) which is also provided with an air blower 19 by which air is impelled through the duct in a direction opposite to the direction of flow of the oil and is expelled to the atmosphere through the same outlet vent 16 as is used as an outlet vent for the part 13 of the duct.

Similarly an inlet vent 20 for the part 18 of the air duct serves also as an inlet for the next part 21 of the air duct. It will be appreciated that if a greater circulation of air is required to enable the required quantity of heat to be extracted from the oil in the heat exchanger 11, further intermediate vents such as 16 can be introduced between the vents 15 and 20, the direction of air flow preferably being so arranged in successive sections of the air duct that the air flow is alternately in the same direction and in the opposite direction to the oil flow. This may especially be necessary where the oil circulates through more than one joint length of cable, i.e. where there are one or more straight through joints in the cooled length (4). Alternatively, where less heat has to be extracted, the intermediate vent 16 may be omitted. If this is done the direction of air flow is arranged to be opposed to the direction of oil flow in each length of the heat exchanger between vents.

The oil passes from the pipes 12 through a pipe 12e back into the section 4 of the cable 1 at the high pressure joint 6 and into the parallel sections of the cables 2 and 3 at further high pressure joints 22.

From the drawing it will be seen that a similar cooling system is provided for the section 4a of the cable 1 and the parallel sections of the cables 2 and 3 and that similar cooling arrangements are provided for other sections of the cable along its length.

In accordance with normal practice, compensating means to allow for changes in volume of the oil with changes in the temperature will be connected in the oil circulating system. This can conveniently be in the form of the normal bellows type expansion chambers arranged within or adjacent to the air duct.

The air duct is preferably buried in the same trench as the cables alongside the cables. As seen in FIGURE 2 the duct 13 is provided with a concrete cover 23 allowing access to the pipes 12a–12d. The pumps 9 and 10 are also preferably underground but the air inlet and outlet vents 15, 16 and 20 preferably project at least 10′ (3 metres) from the ground level.

When the cables themselves are installed in a duct, this duct can also function as the air duct forming part of the elongated heat exchanger or exchangers. In other words both the cables and the oil return pipes, such as the pipes 12a–12d, will be installed in the same duct through which cooling air is circulated as described with reference to FIGURE 3. The duct used for this purpose will preferably be a chase or tunnel 6–9′ (2–3 metres) in diameter.

Referring to FIGURE 3 the installation shown is similar to that shown in FIGURES 1 and 2 except that a single outlet pipe 25 from the pump 10, which extracts oil from the stop joint 5, is connected to an annular pipe 26 for the oil, surrounding an air duct 27, and that, from the annular pipe 26, the oil flows through a pipe 28 into the high pressure joint 6. Thus in this case the return pipe comprises the pipes 25, 26 and 28. To ensure adequate dispersal of the oil around the air duct, the annular part 26 of the return pipe is provided in a known manner with internal helical barriers. The air blowers and air vents are similar to and are given the same references as the equivalent parts of the installation shown in FIGURES 1 and 2.

Although when the secondary cooling fluid is air we prefer to use the arrangement shown in FIGURE 2, a modified arrangement can be used in which the flow path for the secondary fluid concentrically surrounds the flow path (return pipe) for circulating oil. When the secondary cooling fluid is water and the water flows through a pipe surrounding and concentric with the oil return pipe, the outer pipe need not be impervious to soil moisture since water permeating into the pipe would not cause serious adulteration. Similarly, when the secondary fluid is air, any water leaking into the pipe would be evaporated by the air passing through it and its evaporation would increase the amount of heat extracted from the primary cooling fluid in the return pipe. Consequently the outer pipe can be of a plastics material.

When the secondary cooling fluid is a gas the amount of heat extracted may be increased by introducing water mist, or another volatile liquid in droplet form into the gas duct. For example, in the installations described with reference to the drawings water mist can be introduced into the inlet vents 15 and 20 by means of atomizers.

As in the two installations particularly described by way of example, we prefer that substantially the whole of the return pipe shall form a part of the heat exchanger or exchangers, with the consequence that the heat exchanger or exchangers will extend over substantially the whole of the length of cooled cable.

Cable installation in accordance with the invention have the advantage that the most bulky part of the cooling system—the heat exchanger or exchangers—can be located underground, and that it is possible in some cases to locate the whole of the cooling system, except any air vents necessary, underground.

What I claim as my invention is:

1. In an electric cable installation in which a cable is cooled by the circulation of a primary cooling fluid which passes from one end of a length of the cable to the other through a cable cooling duct and back to said first-mentioned end through a return pipe, laid along substantially the same route as the length of the cooled cable, and through at least one heat exchanger for extracting heat from the primary fluid by means of a circulating secondary cooling fluid, the use of a heat exchanger of which a major part of the return pipe forms a part associated with and extending along a major part of the length of cooled cable, said major part of the return pipe being annular and its inner wall forming a duct for the circulating secondary cooling fluid.

2. An installation as claimed in claim 1 in which the primary cooling fluid is an insulating fluid and the cable cooling duct is a duct in a conductor of the cable from which the fluid can permeate into the conductor dielectric as an impregnant therefor.

3. An installation as claimed in claim 1 in which substantially the whole of the length of the return pipe forms a part of at least one heat exchanger and at least one heat exchanger extends over substantially the whole of the length of cooled cable.

4. In an electric cable installation in which a cable is cooled by the circulation of a primary cooling fluid which passes from one end of a length of the cable to the other through a cable cooling duct and back to said first mentioned end through a return pipe, laid along substantially the same route as the length of cooled cable, and through at least one heat exchanger for extracting sufficient heat from the primary fluid passing through the return pipe to maintain the cable at a desired temperature the use of a heat exchanger associated with and extending along a major part of the length of cooled cable and comprising a duct through which a major part of the return pipe passes and means for passing a secondary cooling fluid through the duct.

5. An installation as claimed in claim 4 in which the primary cooling fluid is an insulating fluid and the cable cooling duct is a duct in a conductor of the cable from which the fluid can permeate into the conductor dielectric as an impregnant therefor.

6. An installation as claimed in claim 4, in which the return pipe is annular over a major part of its length and the inner wall of its annular part forms a duct for the secondary cooling fluid.

7. An installation as claimed in claim 4 in which substantially the whole of the length of the return pipe forms a part of at least one heat exchanger and at least one heat exchanger extends over substantially the whole of the length of cooled cable.

8. In an electric cable installation in which a cable is cooled by the circulation of a cooling fluid which passes from one end of a length of the cable to the other through a cable cooling duct and back to said first mentioned end through a return pipe, laid along substantially the same route as the length of cooled cable, and through a heat exchanger for extracting sufficient heat from the fluid passing through the return pipe to maintain the cable at a desired temperature, the use of a heat exchanger associated with and extending along a major part of the length and cooled cable and comprising a major part of the return pipe and a duct through which air is passed and then vented to the atmosphere.

9. An installation as claimed in claim 8 in which the cooling fluid is an insulating fluid and the cable cooling duct is a duct in a conductor of the cable from which the fluid can permeate into the conductor dielectric as an impregnant therefor.

10. An installation as claimed in claim 8 in which the air duct is separated into a number of shorter lengths through each of which, separately, air is passed and vented to atmosphere, the ducts together extending over a major part of the cooled length of cable.

11. An installation as claimed in claim 8 in which the return pipe is annular over a major part of its length and the inner wall of its annular part forms a duct for the secondary cooling fluid.

12. An installation as claimed in claim 8 in which substantially the whole of the length of the return pipe forms a part of at least one heat exchanger and at least one heat exchanger extends over substantially the whole of the length of cooled cable.

13. An installation as clamed in claim 8 in which the cooled cable is laid in the duct through which the air is passed.

References Cited

UNITED STATES PATENTS

| | | | |
|---|---|---|---|
| 2,066,321 | 1/1937 | Bennett | 174—15 |
| 2,006,322 | 1/1937 | Bennett | 174—15 |
| 2,150,201 | 3/1939 | Bennett | 174—15 |
| 2,286,594 | 6/1942 | Bennett | 174—15 |
| 2,306,527 | 12/1942 | Daniels | 174—15 |
| 3,111,551 | 11/1963 | D'Ascoli | 174—15 |

FOREIGN PATENTS

| | | |
|---|---|---|
| 832,312 | 4/1960 | Great Britain. |
| 988,030 | 3/1965 | Great Britain. |

ROBERT A. O'LEARY, *Primary Examiner.*

A. W. DAVIS, *Assistant Examiner.*